US008322246B2

(12) United States Patent
Doelling et al.

(10) Patent No.: US 8,322,246 B2
(45) Date of Patent: Dec. 4, 2012

(54) GEAR SHIFTING MECHANISM WITH A LOCKING MECHANISM FOR A GEAR SHIFT TRANSMISSION

(75) Inventors: Matthias Doelling, Bergisch-Gladbach (DE); Andreas Hegerath, Bergheim (DE); Patrick Soehnge, Wuppertal (DE)

(73) Assignee: Getrag Ford Transmissions GmbH, Cologne (DE)

( * ) Notice: Subject to any disclaimer, the term of this patent is extended or adjusted under 35 U.S.C. 154(b) by 369 days.

(21) Appl. No.: 12/575,407

(22) Filed: Oct. 7, 2009

(65) Prior Publication Data

US 2010/0083785 A1    Apr. 8, 2010

(30) Foreign Application Priority Data

Oct. 8, 2008 (DE) .................... 10 2008 050 810

(51) Int. Cl.
G05G 5/08 (2006.01)
B60K 20/02 (2006.01)
(52) U.S. Cl. .................... 74/473.25; 74/473.28
(58) Field of Classification Search .. 74/473.24–473.26, 74/473.36; 267/158–160, 163, 164
See application file for complete search history.

(56) References Cited

U.S. PATENT DOCUMENTS

| 1,491,283 | A | * | 4/1924 | Alspaugh ................... 74/473.26 |
| 2,953,035 | A | * | 9/1960 | Herr, Jr. ..................... 74/473.26 |
| 3,529,487 | A | | 9/1970 | Dolan |
| 3,675,958 | A | * | 7/1972 | Duffy ............................ 411/523 |
| 4,505,010 | A | * | 3/1985 | Arenhold ........................ 24/456 |
| 4,550,628 | A | | 11/1985 | Yarnell |
| 4,633,730 | A | * | 1/1987 | Scalisi et al. ............... 74/473.24 |
| 4,726,250 | A | * | 2/1988 | Reed, Jr. .................... 74/473.24 |
| 4,856,362 | A | * | 8/1989 | Jester ......................... 74/473.24 |
| 5,531,133 | A | | 7/1996 | Takemura et al. |
| 2010/0000360 | A1 | * | 1/2010 | Kronstadt et al. ......... 74/473.11 |

FOREIGN PATENT DOCUMENTS

| DE | 44 24 543 | 1/1995 |
| EP | 0331278 | 9/1989 |
| EP | 2 175 176 | 4/2010 |

* cited by examiner

*Primary Examiner* — Troy Chambers
*Assistant Examiner* — Terence Boes
(74) *Attorney, Agent, or Firm* — Schlee IP International, P.C.; Alexander R. Schlee

(57) ABSTRACT

A gear shift mechanism of a gear shift transmission having a plurality of gears is described. A first movable gear shift fork and at least one second movable gear shift fork are provided for engaging gears of the gear shift transmission and assuming a neutral position as well as an engaged position where a gear allocated to a respective one of the first and second gear shift forks is engaged. A locking mechanism comprising a locking element is provided that prevents that both gear shift forks can assume at the same time unintentionally an engaged position. The locking mechanism is designed such that in a locking position a force for moving the first gear shift fork out of its neutral position does not generate a resulting component of force that would force the locking element against the second gear shift fork.

13 Claims, 3 Drawing Sheets

Fig. 1
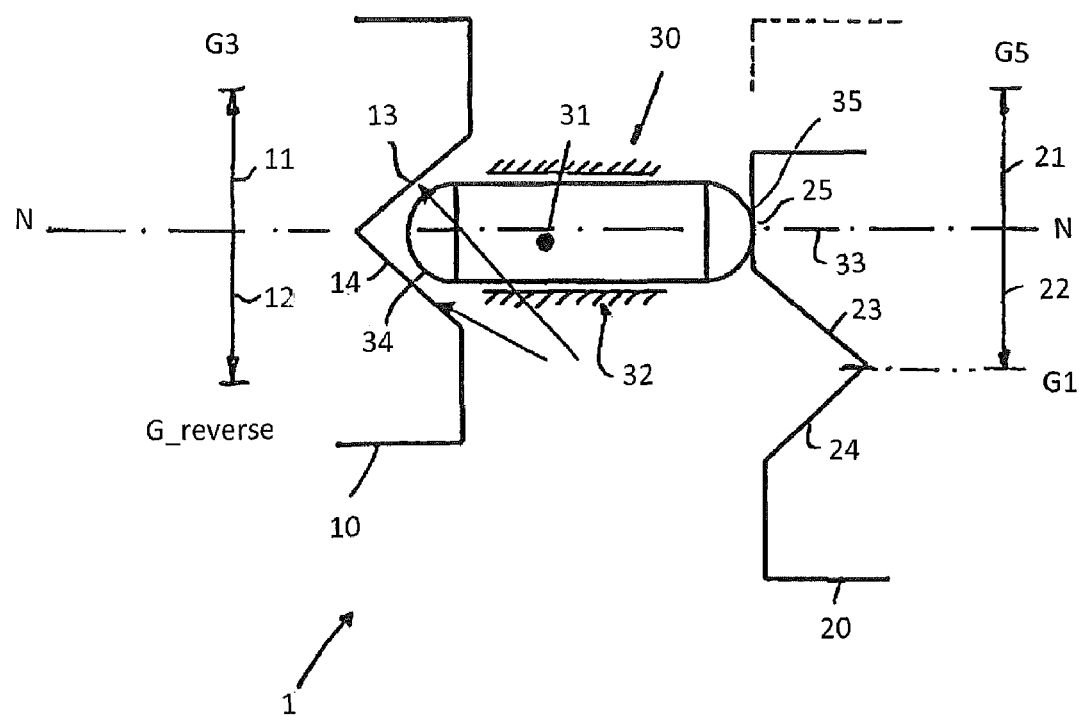
Fig. 3.
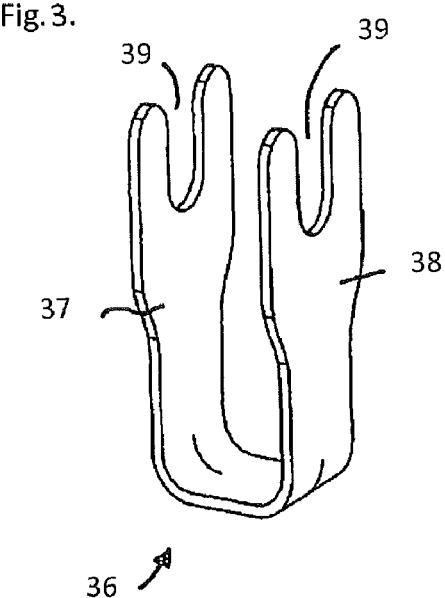
Fig. 4

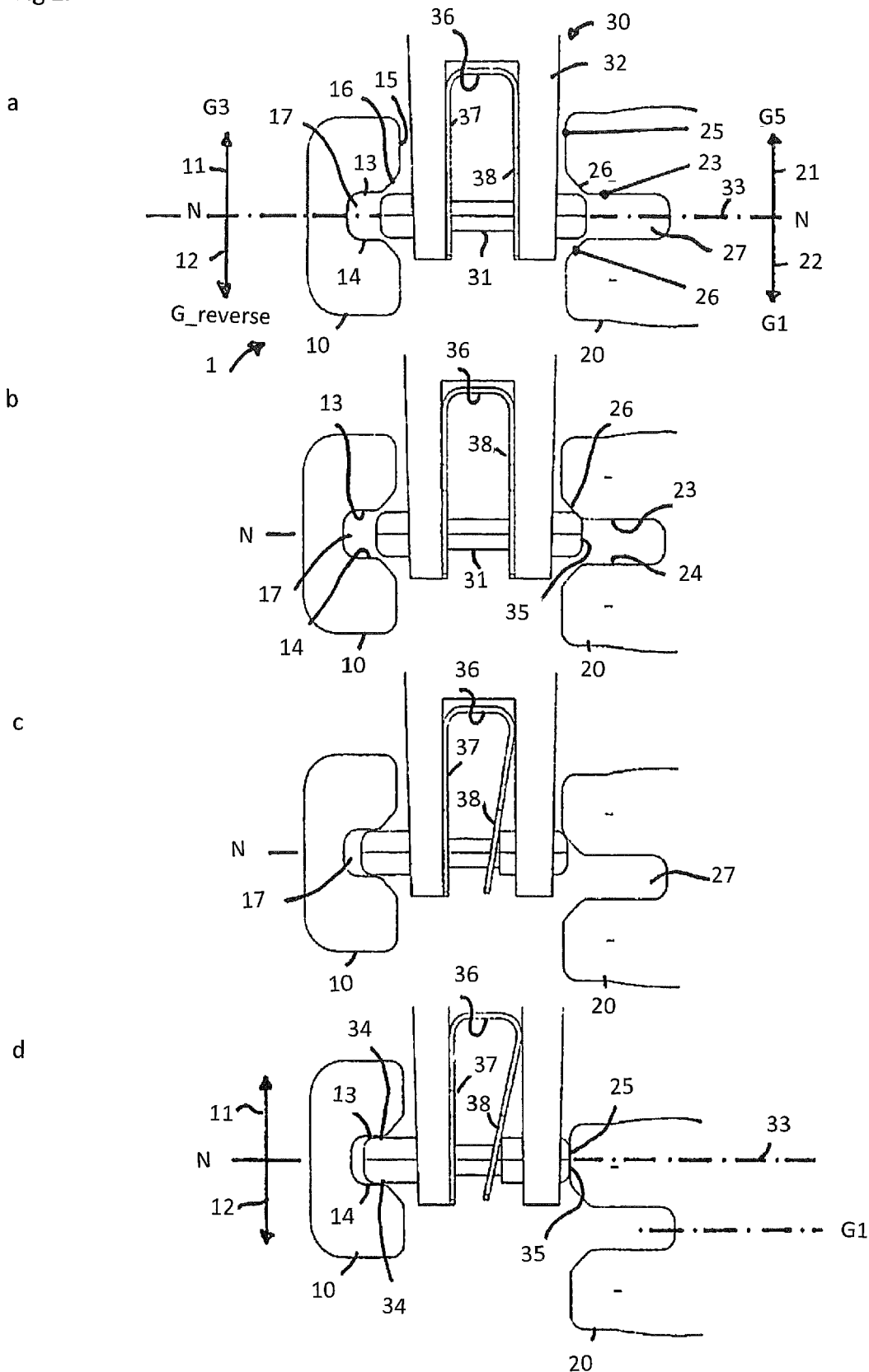

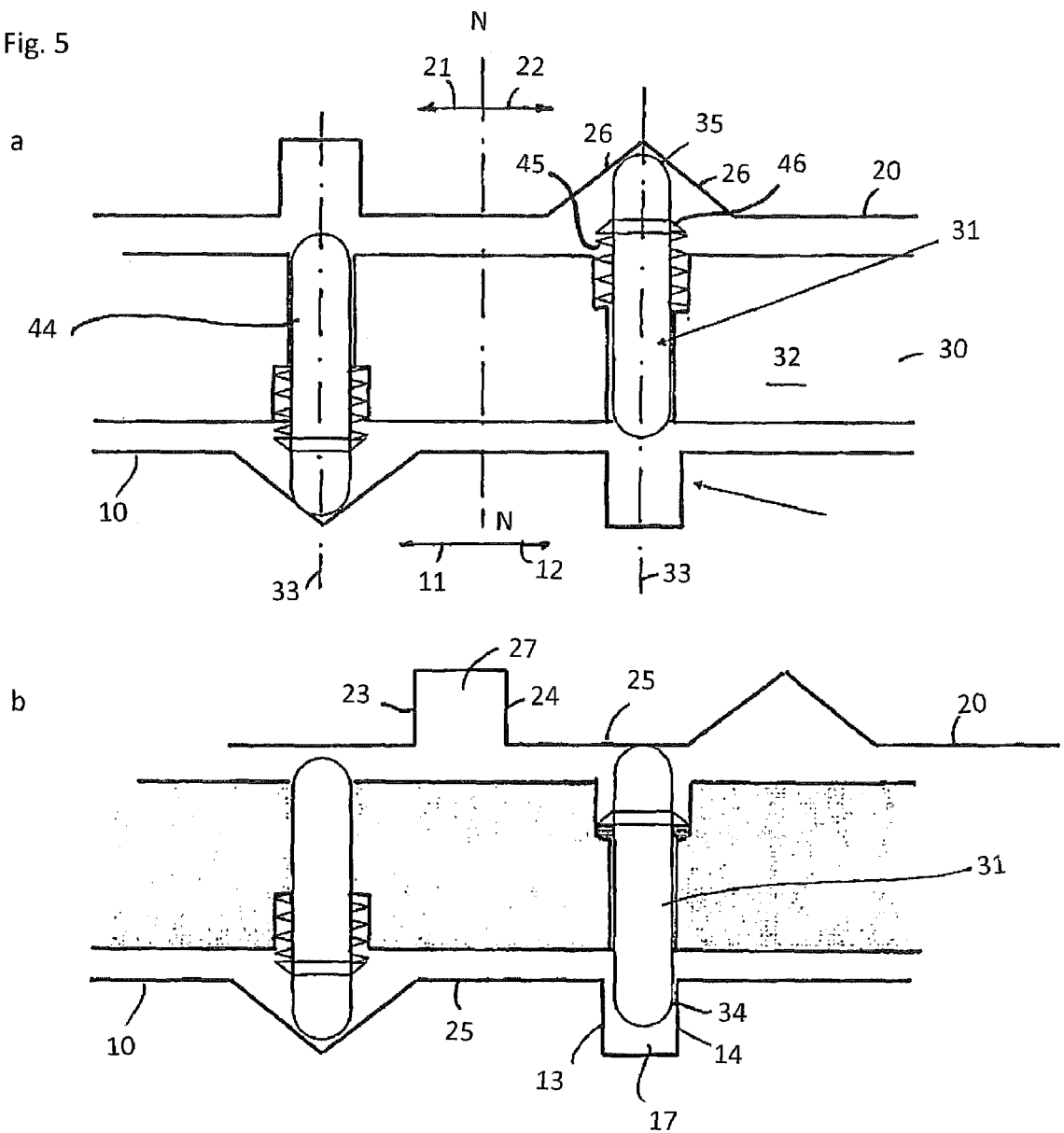

GEAR SHIFTING MECHANISM WITH A LOCKING MECHANISM FOR A GEAR SHIFT TRANSMISSION

CROSS REFERENCE TO RELATED APPLICATION

This application claims the priority right from the German patent application DE 102008050810.1 that was filed on Oct. 8, 2008, the content of which is herewith incorporated in its entirety by reference.

BACKGROUND OF THE INVENTION

The invention comprises a gear shifting mechanism for a gear shift transmission comprising a plurality of gears, the gear shifting mechanism comprising a first movable gear shift fork and at least one second movable gear shift fork adapted to engage gears and a locking mechanism preventing that the gear shift forks can assume at the same time unintentionally an engaged position.

From EP 0 331 278 A2 a gear shifting mechanism for a gear shift transmission comprising a plurality of gears is known wherein a first gear shift fork and a second gear shift fork are provided. Each of the gear shift forks comprises a gear shift rod, the gear shift rods extending in parallel to each other. The gear shift forks can be moved in the longitudinal direction of the gear shift rods. If a gear shift fork assumes its neutral position, no gear allocated to this gear shift fork is engaged. If, however, the gear shift fork assumes its engaged position, a gear that is allocated to that gear shift fork is engaged.

For preventing that in a gear shift transmission comprising a plurality of gears two of these gears are engaged at the same time, a locking mechanism is provided that comprises a first movable locking element. The locking element is rotation-symmetric and comprises a cylindrical middle portion and two conical end portions. The locking element is movable along a locking channel that extends perpendicular to the shifting rods that extend in parallel to each other.

The shifting rods of the shifting forks extend through the locking channel and comprise at the level of the locking channel a recess. If the shifting forks assume their neutral position, due to the recesses formed in the shifting rods, the locking element can be moved along the locking channel. If from there for example the second gear shift fork is moved from its neutral position into an engaged position for engaging a gear that is allocated to that gear shift fork, the recess of the shifting rod of the second gear shift fork moves out of the locking channel. An inner wall of the recess in the shifting rod allocated to the moved second shifting rod interacts with one of the two conic end portions of the locking element wherein the inner wall of the recess forces the locking element via the conical end portion laterally along the locking channel. The locking element then engages with its other end portion the recess formed in the non-moved first gear shift fork that still assumes its neutral position. The locking element is thereby fixed within the locking channel by means of a side wall of the shifting rod of the shifted second gear shift fork. Since the locking element cannot be moved along the channel, it fixes the first gear shift fork in its neutral position. A contact face of the locking element that is the circumferential face of the conic end portion, engages the first gear shift fork via the inner walls of the recesses of the shifting rod. An inner wall of the recess of the locked gear shift fork can also be called a locking face. Therefore, the EP 0 331 278 A2 accomplishes that only one gear of the gear shift transmission comprising a plurality of gears is engaged at any given time for preventing damage to the transmission that otherwise might be the consequence of engaging two gears unintentionally at the same time.

In automated or automatic gear shift transmissions comprising multiple gears the failure might occur that despite a gear being already engaged the other gear shift fork is forced by a malcontrolled actuator in direction of an engaged position. In case of the gear shifting mechanism taught by EP 0 331 278 A2 this results in that the locking element within the locking channel that should prevent a movement of the first gear shift fork from its still assuming neutral position in direction of an engaged position is moved laterally by the conic end portion.

Since the locking element is supported in the longitudinal direction of the locking channel by the second gear shift fork that assumes already its engaged position, a force acting upon the first gear shift fork results in a force directed laterally upon the second gear shift fork that assumes already its engaged position. Since action equals minus reaction, also the first gear shift fork is subjected to a force directed laterally. Therefore, the gear shift forks have to be supported such that these can bear the lateral forces acting upon these gear shift forks without problems. However, this requires a complex structure of the gear shifting mechanism resulting in higher costs.

SUMMARY OF THE INVENTION

It is therefore an object of the invention to create a gear shifting mechanism for a gear shift transmission comprising a plurality of gears that has a simple structure and prevents that two gears of the gear shift transmission are unintentionally engaged at the same time.

This underlying object is achieved by a gear shift mechanism of a gear shift transmission having a plurality of gears, said gear shift mechanism comprising: a first movable gear shift fork and at least one second movable gear shift fork adapted to engage gears of the gear shift transmission and adapted to assume a neutral position as well as an engaged position where a gear allocated to a respective one of the first and second gear shift forks is engaged, a locking mechanism preventing that the gear shift forks can assume at the same time unintentionally an engaged position, the locking mechanism comprising at least one movable locking element assuming a locking position when the second gear shift fork is in an engaging position engaging a gear, wherein in said locking position of the locking element, a contact face of the locking element and a locking face of the first gear shift fork engage each other and therefore hold the first gear shift fork in a neutral position, wherein the contact face of the locking element and the locking face of the first gear shift fork are designed such that in a locking position a force for moving the first gear shift fork out of its neutral position does not generate a resulting component of force that would force the locking element against the second gear shift fork.

The gear shifting mechanism according to the invention has the characteristics that the contact face of the locking element and the locking face of the first gear shift fork are designed such that in a locking position a force for moving the first gear shift fork out of its neutral position does not generate a resulting component of the force that forces the locking element against of the second gear shift fork. Preferably, a support block bears the forces the locking element is subjected to when moving the first gear shift fork out of its neutral position. Due to the preferred bearing of the entire forces by means of the support block, the first locking element does not transmit any forces onto the second gear shift fork so that a support of the second gear shift fork does not have to be designed for bearing such forces. This simplifies the structure of the gear shifting mechanism and allows for a less expensive structure.

The locking mechanism accomplishes that the first gear shift fork and the second gear shift fork do not assume unintentionally at the same time an engaged position and therefore prevents that two gears of a gear shift transmission having multiple gears are engaged simultaneously. The gear shift mechanism according to the present invention can also be used in a dual clutch transmission having two partial transmissions. For providing an acceleration performance without any interruption in the driving power one gear each is engaged in each partial transmission of the dual clutch transmission. In this case, the control provides for engaging gears in a dual clutch transmission simultaneously. However, with respect to a partial transmission, it has to be taken care of only engaging one gear at any given point in time within that partial transmission. Therefore, when using of the gear shifting mechanism according to the invention in a dual clutch transmission, the locking action of the locking mechanism relates to one of the partial transmissions, respectively. This does of course not exclude that for each partial transmission of a dual clutch transmission one gear shifting mechanism according to the present invention is provided, respectively.

DETAILED DESCRIPTION OF THE INVENTION

A moving direction of the first gear shift fork and a moving direction of the first locking element may extend perpendicular to each other and the contact face of the first locking element and the locking face each extend perpendicular to the moving direction of the first gear shift fork. If unintentionally a force is acting upon the first gearshift fork for moving it along the moving direction, due to the interacting faces (contact face and locking face) being perpendicular to the moving direction of the first gear shift fork, this force is not converted into a force directed along the moving direction of the first locking element. This results in that no forces act upon the locking element in the moving direction of the locking element that would otherwise need to be absorbed.

The locking element may be designed as a locking pin engaging with its one end a recess provided in the first gear shift fork, wherein an inner wall forming of the boundaries of the recess provides the locking face. For example, the recess may be a slot having a substantially rectangular cross section and comprise two side walls and a bottom of the slot. The side walls opposing each other form the respective locking faces. If the locking pin engages the slot, the gear shift fork is locked in two directions. This prevents securely an unintentional movement of a gear shift fork from the neutral position into two directions.

According to a preferred embodiment the first locking element is unlocked when both the first and the second gear shift fork assume their neutral positions. According to the invention it is provided that a shifting of the first gear shift fork out of the neutral position does not generate forces moving the first locking element along its moving direction so that there is a possibility that the first locking element remains in its locking position locking the first gear shift fork even after a respective gear has been disengaged by the second gear shift fork. This may prevent unintentionally that the first gear shift fork may engage a gear at this point in time. For avoiding this, it is useful that the locking mechanism comprises means forcing the locking element from its locking position back into a resting position. When the locking element assumes this resting position, the first gear shift fork can be moved out of its neutral position.

Preferably, the second gear shift fork comprises a control face contacting the locking element in its resting position when the second gear shift fork is moved out of its neutral position, wherein the control face converts a movement of the second gear shift fork into a movement of the locking element from its resting position into the locking position. Therefore, the control face accomplishes to initiate a movement of the locking element by a movement of the second gear shift fork. Therefore, the control face of the second gear shift fork has, a function that is to be prevented in the locking face of the first gear shift fork.

In this connection it is pointed out that between the control face of the second gear shift fork and the locking element a narrow gap may be provided in the neutral position of the second gear shift fork. If, however, the second gear shift fork is moved only minimally out of its neutral position, the gap is closed and the first locking element is in contact with the control face of the second gear shift fork. In an analog fashion, this applies also to the contact face of the locking element and the locking face of the first gear shift fork. Also in this case a narrow gap may be provided that is closed immediately when the respective forces act upon the gear of the first gear shift fork.

The second gear shift fork comprises a blocking face contacting the locking element when it assumes the locking position. Therefore, the second gear shift fork assumes via the blocking face a defined position of the first locking element, accomplishing that initially the first gear shift fork is locked into its neutral position. When moving from resting position into the locking position the blocking element first comes into contact with the control face in the embodiment described above and then with the blocking face of the second gear shift fork. In this connection, the control face, blocking face and the locking element can be designed such that the blocking face comes into contact in case of a movement of the locking element when the locking element has just reached the locking position, i.e. when the contact face of the locking element and the locking face of the first gear shift fork come into contact with each other.

According to a preferred embodiment of the invention, the first movable locking element assumes a locking position determined by the first gear shift fork if the first gear shift fork engages another gear and the second gear shift fork now assumes its neutral position, wherein in this locking position a further contact face of the first locking element and a locking face of the second gear shift fork engage each other, wherein the further contact face of the first locking element and the locking face of the second gear shift fork are designed such that a force applied for moving the second gear shift fork out of its neutral position does not comprise any resulting components of force that force the first locking element against the first gear shift fork. Therefore, the first locking element accomplishes a mutual locking of the first and the second gear shift forks. If by means of the first gear shift fork a gear is engaged, the second gear shift fork is locked in its neutral position. In return, a gear engaged by means of the second gear shift fork results in fixing the first gear shift fork in its neutral position. In both cases, due to the particular design of the contact face of the first locking element, an unintentional movement of a gear shift fork assuming its neutral position does not result in subjecting the gear shift fork that assumes its engaged position to a force. The locking element is therefore preferably designed symmetrical with respect to the first and the second gear shift forks. This applies also to the gear shift forks with its locking faces and control faces that are preferably designed identically for the gear shift forks. This accomplishes an identical locking action for both of the gear shift forks.

In an alternative, the locking mechanism may comprise a second locking element that assumes a locking position fixed by the first gear shift fork when it engages a gear, wherein in this locking position a contact face of the second locking element and a locking face of the second gear shift fork engage each other and therefore hold the second gear shift fork in its neutral position, wherein the contact face of the second locking element and the locking face of the second gear shift fork are designed such that in this locking position a force for moving the second gear shift fork out of its neutral position does not generate a resulting component of force that would force the second locking element against the first gear shift fork. According to this embodiment, one locking element each is provided for locking a respective gear shift fork in its neutral position. While the first locking element accomplishes locking of the first gear shift fork, the second locking element is responsible for locking the second gear shift fork in its neutral position. This requires, however, two independent locking elements, but due to their functions and directed to one gear shift fork only each, these locking elements can be designed and supported in a simple manner. The use of two locking elements accomplishes also in a simple manner that the control face and the locking face are separated from each other and can therefore be designed independently (for example with respect to tolerances).

The forcing means forcing the respective first locking element and/or the second locking element from its engaged and locked position into the resting position may comprise a spring that is preferably supported at the support block of the locking mechanism. The spring can for example be a leg spring with two legs that are spaced apart from each other. The legs may comprise an open receiving portion into which the locking element can be inserted. The locking elements can then be moved from their resting position against the force generated by the leg spring into the locking position or into the locking positions.

In the alternative, the spring may be designed as a helical spring biasing the first locking element and/or the second locking element towards its resting positions.

By referring to the embodiments shown in the drawings, the invention is explained in more detail in the following.

BRIEF DESCRIPTION OF THE DRAWINGS

In the drawings show:

FIG. 1 schematically parts of the shifting mechanism according to the prior art;

FIG. 2 schematically parts of a first embodiment of the invention in the variety of positions;

FIG. 3 a leg spring according to the embodiment shown in FIG. 2;

FIG. 4 a locking element according to the embodiment shown in FIG. 2; and

FIG. 5 schematically parts of a second embodiment of the invention.

DETAILED DESCRIPTION OF THE DRAWINGS

FIG. 1 shows schematically parts of a shifting mechanism according to the prior art. A first gear shift fork 10 that is only shown in part can be moved from the neutral position N in direction of arrows 11, 12.

Next to the first gear shift fork 10, a second gear shift fork 20 (only shown in part) is provided that can be moved in parallel to the first gear shift fork 10 in direction of the arrows 21, 22. In a gear shift transmission having multiple gears and having the gear shift mechanism installed, the gear shift forks 10, 20 can be allocated to two gears each. In particular, the gear shift transmission having multiple gears can be a partial transmission of a dual clutch transmission, accommodating the odd numbered forward gears G1, G3, G5 and one reverse gear G_reverse. The second gear shift fork 20 is shown in a gear engaged gear position where the forward gear G1 is engaged. The other gears shown in FIG. 1 are not engaged. The first gear shift fork 10 as well as the second gear shift fork 20 comprise a fork part that is not shown and designed to move a sliding sleeve within the gear shift transmission in an axial direction. By means of shifting the sliding sleeve in an axial direction, a locking connection can be provided between a loose wheel and a shaft of the gear shift transmission such that the loose wheel and the shaft rotate together, wherein the sliding sleeve and the loose wheel are both provided on said shaft. When the loose wheel and the sliding sleeve are interlocked, a gear that is allocated to the particular loose wheel is engaged in the gear shift transmission.

Between the first gear shift fork 10 and the second gear shift fork 20 a locking mechanism 30 is provided comprising a first locking element 31. Further, the locking mechanism 30 comprises a support block 32 that is only shown schematically in FIG. 1. The support block 32 provides bearing of the locking element 31 such that it can be moved along an axis 33. The axis 33 extends perpendicular to the moving directions 11, 12, 21, 22 of the gear shift forks 10, 20.

The locking element 31 comprises at its end contact faces 34, 35 having approximately the shape of a hemisphere. The contact face 34 of the locking element 31 interacts with locking faces 13, 14 of the first gear shift fork 10. In an analog fashion as the first gear shift fork 10 also the second gear shift fork comprises locking faces 23, 24. If it is attempted to move the first gear shift fork 10 from the neutral position N in direction 11, wherein the forward gear G3 would then be engaged, the locking face 14 is pressed against the contact face 34 of the first locking element 31. Since the first locking element 31 is supported via its contact face 34 at a blocking face 25 at the second gear shift fork 20 and the second gear shift fork 20 is non-resilient in direction of the axis 33, the first locking element 31 cannot move, so that the first gear shift fork 10 is locked in the neutral position N or proximately adjacent thereto. However, a gear shift force that is required for moving the first gear shift fork 10 out of the neutral position N requires to generate lateral forces due to the locking faces 13, 14 that are inclined in relation to the axis 33, and these lateral forces act upon the first gear shift fork 10 and the second gear shift fork 20. Therefore, the first locking element 31 presses with its contact face 35 laterally against the second gear shift fork 20. This applies likewise to the first gear shift fork 10 that has to bear the reaction forces.

While FIG. 1 shows parts of a shifting mechanism 1 according to the prior art, FIG. 2 shows parts of a first embodiment of the invention. FIG. 2 shows like FIG. 1 a first shifting fork 10, a second shifting fork 20, as well as a locking mechanism 30. The second shifting fork 20 is shown in FIG. 2 in various positions, namely in FIG. 2a in a neutral position N and in FIG. 2d in a engaged gear position wherein the forward gear G1 of a gear shift transmission having multiple gears is engaged. The FIGS. 2b and 2c show positions of a second gear shift fork 20 that are passed on the way from the neutral position N of the second gear shift fork 20 when the moving into the engaged gear position wherein the forward gear G1 is engaged.

Parts, expressions and features that are identical with those shown in FIG. 1 are denoted in FIG. 2 with the same reference numerals. The same applies for FIGS. 3 to 5 that will be discussed in more detail below.

The engaged gear position of the second gear shift fork 20 shown in FIG. 2d corresponds with the engaged gear position of the second gear shift fork 20 that is shown in FIG. 1. As well as in the gear shift mechanism of FIG. 1, also in the gear shift mechanism of the first embodiment of the invention according to FIG. 2 three forward gears G1, G3, G5 and a reverse gear G_reverse (see FIG. 2a) can be engaged. For example, the gear shift transmission having multiple gears can be a partial transmission of a dual clutch transmission comprising six forward gears and one reverse gear, wherein the even numbered forward gears are provided in one of the partial transmissions of the dual clutch transmission. Referring to the shiftability of the shifting forks 10, 20 as well as the individual gears that that can be engaged by shifting of the gear shift forks 10, 20, it is referred to the description of FIG. 1.

A locking element 31 is provided in such a fashion that it can be moved along an axis 33 that extends perpendicular to the moving directions 11, 12, 21, 22 along which the shifting forks 10, 20 can be shifted. A U-shaped support block 32 bears the locking element 31 such that it can be shifted within of the support block 32. A likewise U-shaped leg spring 36 is inserted into the U-shaped support block 32 and shown separately in a perspective view according to FIG. 3. The U-shaped leg spring 36 comprises two legs 37, 38 that are spaced apart from each other and comprise at their free end an open, fork-shaped receiving portion 39 for receiving the locking element 31. Into these receiving portions 39, the locking element can be inserted from the top into the leg spring 36.

The position shown in FIG. 2a of the locking element 31 is a resting position of the locking element 31. If the locking element 31 is moved from the resting position, the leg spring 36 is deformed elastically. Therefore, the leg 38 is deflected in the direction of the other leg 37 if the second gear shift fork 20 is moved from its neutral position N into the engaged position wherein the forward gear G1 is engaged.

As can be gathered particularly from FIG. 4, showing the locking element 31 in a perspective view, the locking element 31 is rotation-symmetric and comprises a middle portion 40 having a smaller diameter than the end portions 41, 42. Therefore, a ring-shaped step is provided where the middle portion 40 and the end portions 41, 42 meet, this step being engaged by the legs 37, 38 of the leg spring 36 when the gear shift mechanism is assembled. This step 43 is moved along when shifting the locking element 31, moving along one of the engaged legs 37, 38 of the leg spring 36 (see FIG. 2c, 2d).

In contrast to the prior art according to FIG. 1, the locking faces 13, 14 of the first gear shift fork are designed such that in case of an engaged forward gear G1 (see FIG. 2d) any force shifting the first gear shift fork 10 from the neutral position N in directions 11 or 12 does not generate any component of a force acting onto the locking element 31 that could press the locking element 31 in direction of the second gear shift fork 20. The locking faces 13, 14 as well as the contact face 34 of the locking element 31 that is engaged in the FIG. 2d extend all perpendicular to the moving directions 11, 12. Therefore, no force can be transmitted onto the locking element 31 acting in an axial direction thereof.

If, starting from the neutral position N of the second gear shift fork 20, a movement towards the engaged position shown in FIG. 2d takes place, the contact face 35 of the locking element 31 is engaged by a control face 26 of the second gear shift fork 20. Since the control face 26 is inclined in relation to the moving directions 21, 22 of the second gear shift fork 20 or in relation to the moving axis 33 of the first locking element, a further movement of the second gear shift fork 20 in direction of the engaged position results in the shifting of the locking element 31. Therefore, the locking element 31 is moved from a resting position that is shown in FIG. 2a into a locking position as shown in FIG. 2d. In this locking position, as described above, the leg spring 36 that is a deformed elastically presses the locking element 31 back into the resting position. However, the locking element 31 is supported with its contact face 35 at a blocking face 25 of the second gear shift fork 20.

As shown in FIG. 2, the gear shift forks 10, 20 are with respect to the recesses 17, 27 that provide the respective locking faces 13, 14, 23, 24 as well as the control faces 16, 26 of identical shape. Since also the locking element 31 is designed identically in its end portions 41, 42, when moving of the first gear shift fork starting from an assumed starting position according to FIG. 2a that correlates to the neutral position N, the analog actions occur as in case of shifting the second gear shift fork 20 as described above. Therefore, the locking element 31 is moved from its resting position shown in FIG. 2a into a locking position. If the first gear shift fork 10 is moved into an engaged position, the locking element 31 would engage the recess 27 in the second gear shift fork 20 locking it into its neutral position N.

FIG. 5 shows parts of a second embodiment of the invention. In form of partial views a first shifting fork 10 and a second shifting fork 20 are shown that can be moved in the moving directions 11, 12 or 21, 22 for engaging a gear in a gear shift transmission having multiple gears and that comprises the gear shift mechanism according to the invention. FIG. 5a shows the gear shift forks 10, 20 in its neutral positions, respectively. Between the gear shift forks 10, 20 a locking mechanism 30 is provided comprising a first locking element 31 and a second locking element 44. The locking elements 31, 44 are designed identically so that in the following only the first locking element 31 is described. The locking element 31 comprises a substantially hemispherical contact face 34 engaged by a control face 26 of the second gear shift fork 20. The control faces 26 are inclined in relation to the moving directions 21, 22 of the second gear shift fork 20 as well as in relation to an axis 33 along which the first locking element 31 is a new movable, the first locking element 31 being movably supported by a support block 32. When moving the second gear shift fork 20 out of its neutral position N the first locking element is moved via its control face 26 along the axis 33 in direction of the first gear shift fork 10, forcing the first locking element 31 to engage the recess 17 provided in the first gear shift fork 10 (see FIG. 5b). The recess 17 comprises two side walls 13, 14 opposing each other and forming the locking faces, preventing that the first gear shift fork 10 assuming its neutral position N can be moved out of this neutral position. Also in this case the locking faces 13, 14 as well as the engaged contact face 34 extend perpendicular to the moving directions 11, 12, 21, 22 of the gear shift forks 10, 20. When the moving of the locking element 31 from its resting position (see FIG. 5a) into its locking position (see FIG. 5b) a helical spring 45 is deformed elastically, said spring being supported on the one hand on the support block 32 and on the other hand on a plate 46 that is fixed to the locking element 31.

Also the second fork 20 comprises a recess with inner walls 23, 24 opposing each other and being provided for locking the second shifting fork when it assumes the neutral position N and the first gear shift fork 10 assumes its engaged position wherein a gear allocated to the first gear shift fork 10 is engaged.

In the second embodiment according to FIG. 5, in the two gear shift forks 10, 20 the control faces 16 and the locking faces 13, 14 or the control face 26 and the locking faces 23, 24 are spaced apart from each other. However, also in the first embodiment according to FIG. 2, the control faces and the locking faces are not the same in contrast to that being the case in the prior art. Also in this case the control faces are separated from the locking faces. While the control faces engage the locking element 31 only if the latter assumes its resting position or a position close by, the locking faces 13, 14 or 23, 24 only get into engagement with the locking element 31 if it assumes its locking position.

LIST OF REFERENCE NUMERALS

1 gear shift mechanism
10 first gear shift fork
11 moving direction
12 moving direction
13 locking face
14 locking face
15 blocking face
16 control face
17 recess
20 second gear shift fork
21 moving direction
22 moving direction
23 locking face
24 locking face
25 blocking face
26 control face
27 recess
30 locking mechanism
31 locking element
32 support block
33 axis
34 contact face
35 contact face
36 leg spring
37 leg
38 leg
39 receiving portion
40 middle portion
41 end portion
42 end portion
43 step
44 second locking element
45 helical spring
46 plate

What is claimed is:

1. A gear shift mechanism of a gear shift transmission having a plurality of gears, said gear shift mechanism comprising:
   a first movable gear shift fork and at least one second movable gear shift fork adapted to engage gears of the gear shift transmission and adapted to assume a neutral position as well as an engaged position where a gear allocated to a respective one of the first and second gear shift forks is engaged,
   a locking mechanism preventing unintended simultaneous engagement positions of the first and second gear shift forks, the locking mechanism comprising at least one movable locking element assuming a locking position when the second gear shift fork is in an engaging position engaging a gear, wherein in said locking position of the locking element, a contact face of the locking element and a locking face of the first gear shift fork engage each other and therefore hold the first gear shift fork in a neutral position, wherein
   the contact face of the locking element and the locking face of the first gear shift fork are designed such that in a locking position a force for moving the first gear shift fork out of its neutral position does not generate a resulting component of force that would force the locking element against the second gear shift fork; and
   the first locking element assumes a locking position determined by the first gear shift fork if the first gear shift fork engages another gear, wherein in this locking position a further contact face of the locking element and a locking face of the second gear shift fork engage each other, wherein the further contact face of the locking element and the locking face of the second gear shift fork are designed such that a force applied for moving the second gear shift fork out of its neutral position does not comprise any resulting components of force that force the first locking element against the first gear shift fork.

2. A gear shift mechanism according to claim 1, wherein a support block bears the forces the locking element is subjected to when moving the first gear shift fork out of its neutral position.

3. A gear shift mechanism according to claim 1, wherein a moving direction of the first gear shift fork and a moving direction of the first locking element are extending perpendicular to each other and the contact face of the first locking element and the locking face each extend perpendicular to the moving direction of the first gear shift fork.

4. A gear shift mechanism according to claim 1, wherein the locking element is designed as a locking pin engaging with its one end a recess provided in the first gear shift fork, wherein an inner wall of the recess provides the locking face.

5. A gear shift mechanism according to claim 1, wherein the first locking element is unlocked when the second gear shift fork assumes its neutral position.

6. A gear shift mechanism according to claim 1, wherein the locking mechanism comprises forcing means forcing the locking element from the locking position into a resting position.

7. A gear shift mechanism according to claim 6, wherein the forcing means comprises at least one spring.

8. A gear shift mechanism according to claim 7, wherein the spring is a leg spring with two legs that are spaced apart from each other.

9. A gear shift mechanism according to claim 8, wherein the legs comprise an open receiving portion into which the locking element can be inserted.

10. A gear shift mechanism according to claim 7, wherein the spring is a helical spring.

11. A gear shift mechanism according to claim 1, wherein the second gear shift fork comprises a control face contacting the locking element in its resting position when the second gear shift fork is moved out of its neutral position, wherein the control face converts a movement of the second gear shift fork into a movement of the locking element from its resting position into the locking position.

12. A gear shift mechanism according to claim 1, wherein the second gear shift fork comprises a blocking face contacting the locking element when it assumes the locking position.

13. A gear shift mechanism according to claim 1, wherein the locking mechanism comprises a second locking element that assumes a locking position fixed by the first gear shift fork when it engages a gear, wherein in this locking position a contact face of the second locking element and a locking face of the second gear shift fork engage each other and therefore hold the second gear shift fork in its neutral position, wherein the contact face of the second locking element and the locking face of the second gear shift fork are designed such that in this locking position a force for moving the second gear shift fork out of its neutral position does not generate a resulting component of force that would force the second locking element against the first gear shift fork.

* * * * *